United States Patent
VanDuyn et al.

(10) Patent No.: US 8,120,897 B2
(45) Date of Patent: Feb. 21, 2012

(54) TELEVISION WITH FOLDING STAND

(75) Inventors: Luke VanDuyn, Highlands Ranch, CO (US); Daniel L Rudolph, Castle Rock, CO (US); Neil Marten, Denver, CO (US); Dallas Grove, San Carlos, CA (US)

(73) Assignees: EchoStar Technologies L.L.C., Englewood, CO (US); Sling Media, Inc., Foster City, CA (US)

( * ) Notice: Subject to any disclaimer, the term of this patent is extended or adjusted under 35 U.S.C. 154(b) by 112 days.

(21) Appl. No.: 12/437,487

(22) Filed: May 7, 2009

(65) Prior Publication Data

US 2010/0284137 A1    Nov. 11, 2010

(51) Int. Cl.
*H05K 7/16*    (2006.01)

(52) U.S. Cl. .................................. 361/679.22; 248/917

(58) Field of Classification Search ............ 361/679.21, 361/679.22; 248/917–924
See application file for complete search history.

(56) References Cited

U.S. PATENT DOCUMENTS

| | | | |
|---|---|---|---|
| 2,903,222 A | 9/1959 | Levi | |
| D323,324 S | 1/1992 | Suda | |
| 5,522,574 A | 6/1996 | Maglione | |
| 5,986,634 A | 11/1999 | Alioshin et al. | |
| 6,006,243 A | 12/1999 | Karidis | |
| D525,953 S | 8/2006 | Anzures | |
| 7,251,125 B2 | 7/2007 | Heckerman | |
| D548,206 S | 8/2007 | Han | |
| D550,173 S | 9/2007 | Wang et al. | |
| 7,336,478 B2* | 2/2008 | Jang ......................... | 361/679.27 |
| D581,379 S | 11/2008 | Chiu | |
| 7,448,581 B2* | 11/2008 | Lim et al. ................... | 248/176.3 |
| D587,226 S | 2/2009 | Funayama | |
| D587,281 S | 2/2009 | Kim et al. | |
| 7,495,897 B2* | 2/2009 | Yokawa ................... | 361/679.22 |
| D596,596 S | 7/2009 | Honda | |
| D597,980 S | 8/2009 | Vitito | |
| D598,406 S | 8/2009 | Wang | |
| 7,614,591 B2* | 11/2009 | Yen ............................... | 248/150 |
| 7,684,185 B2* | 3/2010 | Farrugia ................... | 361/679.41 |
| 2001/0048584 A1* | 12/2001 | Rosen .......................... | 361/681 |
| 2007/0008686 A1* | 1/2007 | Jang ............................. | 361/681 |
| 2007/0192990 A1 | 8/2007 | Christensen | |

OTHER PUBLICATIONS

"Portable DVD Player User Manual," http://www.consumer.philips.com/consumer/en/sa/consumer/cc/_productid_PET831_98_SA_CONSUMER/Portable-DVD-Player+PET831-98-, retrieved Jul. 16, 2009, 28 pages.
"VA902b 19" Value Series LCD Display," http://tom.viewsonic.com/products/desktopdisplays/lcddisplays/valueseries/va902b/, retrieved Jul. 16, 2009, 2 pages.

* cited by examiner

*Primary Examiner* — Jinhee Lee
*Assistant Examiner* — Ingrid Wright
(74) *Attorney, Agent, or Firm* — Seed IP Law Group PLLC

(57) ABSTRACT

This disclosure generally relates to a television that includes a foldable stand for selective support of the device in a variety of positions and/or viewing orientations. In some cases, a television includes a display having a substantially flat display surface, a housing coupled to the display, and a stand having an elongated support leg, the support leg pivotably coupled to the housing about a pivot axis such that the stand is movable between a first position in which a majority of the stand is located within a perimeter of the display surface projected towards a back surface of the housing and a second position in which the stand is adapted, when placed on a support surface, to support the display in a viewing orientation.

20 Claims, 5 Drawing Sheets

TELEVISION WITH FOLDING STAND

BACKGROUND

1. Technical Field

The present disclosure generally relates to stands for supporting televisions and, more particularly, to a stand for selective support of a portable television in a variety of positions and/or viewing orientations.

2. Description of the Related Art

Various means are known for supporting televisions. For example, some televisions, such as CRT televisions, include integral housings with flat bottom surfaces for securely placing the televisions on, for example, a shelf of an entertainment center. Alternatively, when secured to a wall, CRT televisions generally require separate robust mounting assemblies that include a flat support tray upon which the televisions can be placed and rigidly secured.

Other televisions, such as liquid crystal display (LCD) or plasma display televisions, are typically supported either by a rigid stand for placement on a horizontal support surface (e.g., floor, desk, or other furniture) or by a separate wall-mount assembly coupled to the back of the television for mounting to a wall. These stands and wall-mount assemblies are generally removably secured to the television by fasteners such that an owner can choose between mounting the television on a wall or a horizontal support surface. Significant assembly and disassembly is required, however, by the owner (or installation professional) to switch between a wall-mounted arrangement and a horizontal surface mounted arrangement. As such, an owner generally selects one of the aforementioned mounting arrangements for an extended period of time—the television thereby becoming somewhat of a fixture in the selected mounting arrangement.

BRIEF SUMMARY

According to various embodiments, a television is provided with a foldable stand particularly adapted to enable the television to efficiently transition between a wall-mounted television and a free-standing television.

A television may be summarized as including a display having a substantially flat display surface; a housing coupled to the display; and a stand having an elongated support leg, the support leg pivotably coupled to the housing about a pivot axis such that the stand is movable between a first position in which a majority of the stand is located within a perimeter of the display surface projected towards a back surface of the housing and a second position in which the stand is adapted, when placed on a support surface, to support the display in a viewing orientation. When the stand is in the first position, a bottom surface of the stand may be substantially parallel to the display surface. When the stand is in the first position, a bottom surface of the stand may be substantially coplanar with the back surface of the housing. The housing may include a cavity shaped to receive a portion of the stand such that, when the stand is in the first position, the stand may be at least partially received within an outer profile of the housing. The viewing orientation may be one of a plurality of selectable viewing orientations. The viewing orientation may be defined by a tilt angle that ranges from at least between −5 degrees to 20 degrees. The television further including a latch for retaining the stand in the first position.

A television may be summarized as including a display having a substantially flat display surface; a housing coupled to the display; and a stand including a support member spaced from the stand by at least one elongated support leg, the stand movably coupled to the housing such that the stand can be moved between a first position in which the support member is substantially parallel to the display surface and the support leg is located within an outer perimeter of the housing projected towards a back surface of the housing and a second position in which the stand is adapted to, when placed on a support surface, support the display in a viewing orientation. When the stand is in the first position, a bottom surface of the support member may be substantially coplanar with the back surface of the housing. The housing may include a cavity shaped to receive a portion of the stand such that, when the stand is in the first position, the stand may be at least partially received within an outer profile of the housing. The viewing orientation may be one of a plurality of selectable viewing orientations. The viewing orientation may be defined by a tilt angle that ranges from at least between −5 degrees to 20 degrees. The television may further include a latch for retaining the stand in the first position.

A television may be summarized as including a display; a display housing; and a stand pivotably connected to the display housing about a pivot axis for movement between a retracted position and a selectable viewing position, the pivot axis located above a lower surface of the display housing such that at least a substantial portion of the stand is located, when the stand is in the retracted position, within a perimeter of the display projected towards a back surface of the display housing. When the stand is in the retracted position, the stand may be within a projected outer perimeter of the display housing. The display may include a substantially flat display surface, and wherein, when the stand is in the retracted position, a bottom surface of the stand may be substantially parallel to the display surface. When the stand is in the retracted position, a bottom surface of the stand may be substantially coplanar with the back surface of the display housing. The display housing may include a cavity shaped to receive a portion of the stand such that, when the stand is in the retracted position, the stand may be at least partially received within an outer profile of the display housing. The selectable viewing position may be defined by a tilt angle that ranges from at least between −5 degrees to 20 degrees. The television may further include a latch for retaining the stand in the retracted position.

DETAILED DESCRIPTION

Figure 1:
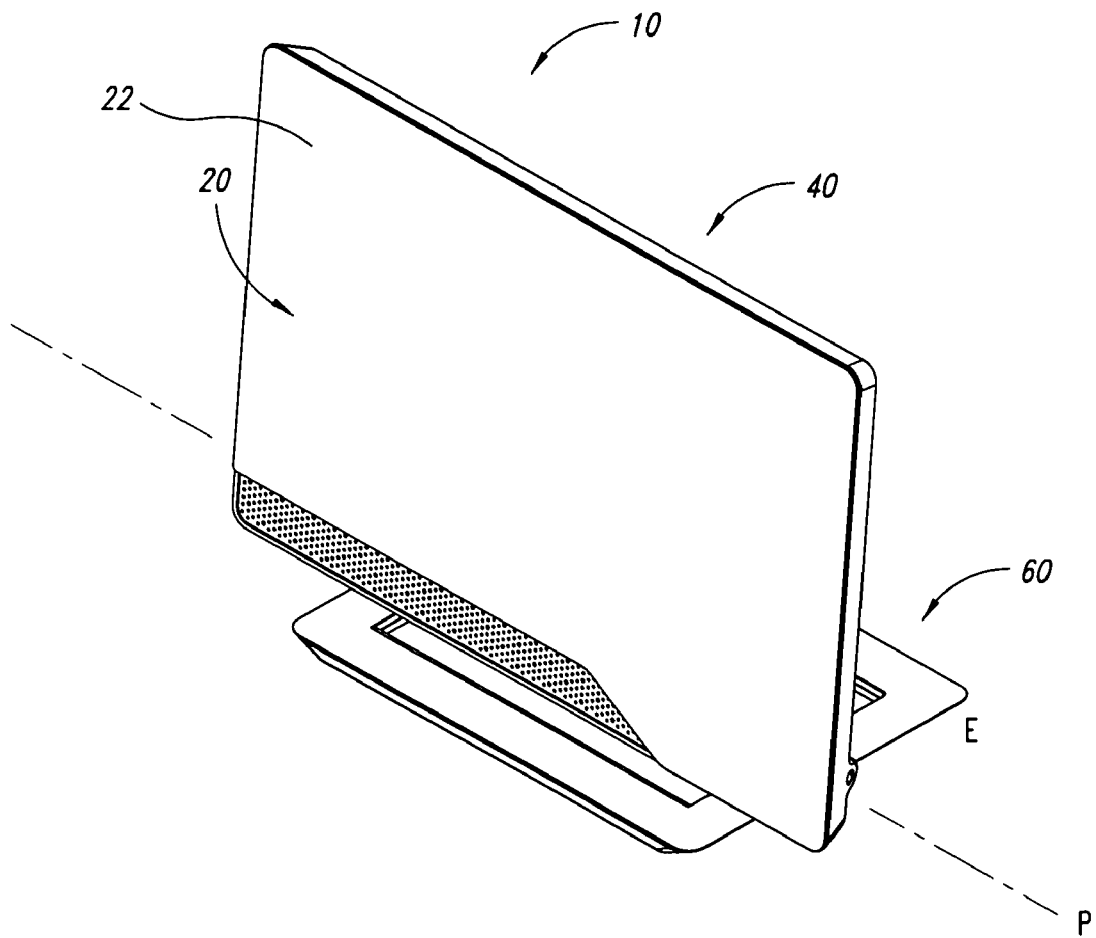
FIG. 1 is a front isometric view of a television showing a stand thereof in an extended position, according to one embodiment.
Figure 2:
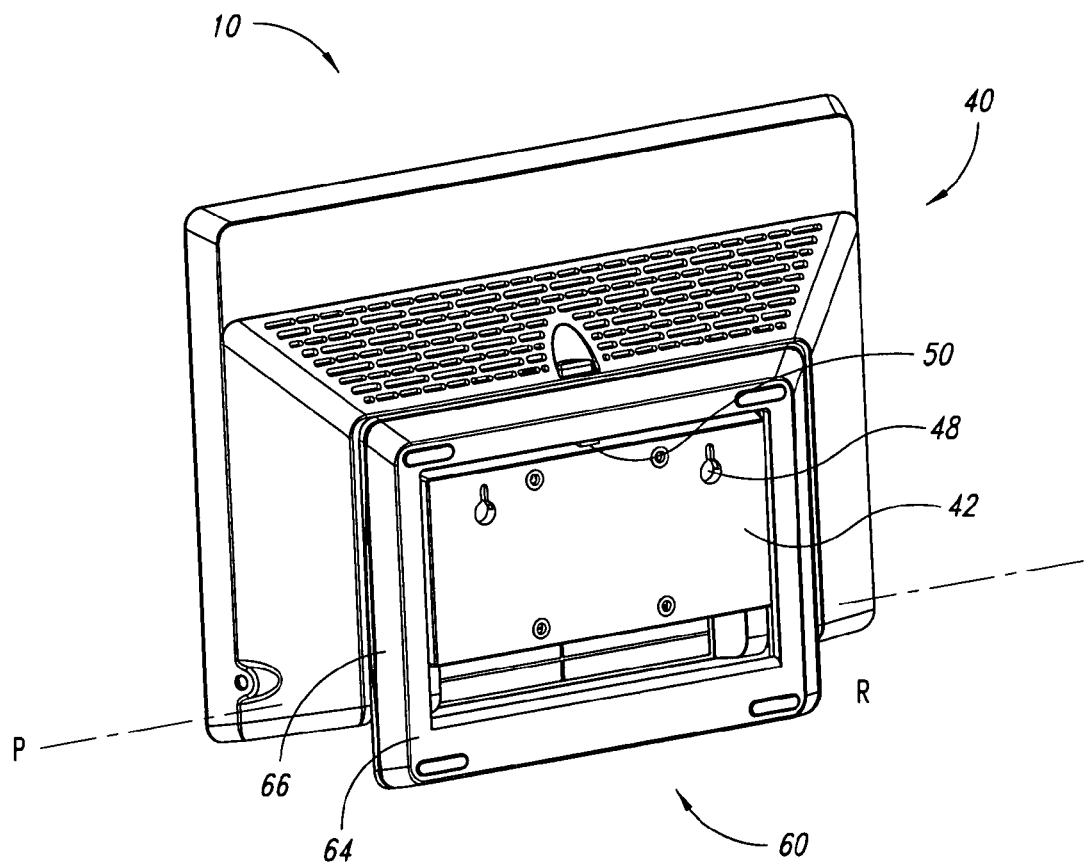
FIG. 2 is a rear isometric view of the television of FIG. 1 with the stand in a retracted position.

FIGS. 1-4 depict a television 10, such as, for example, a portable WiFi TV, that includes a display 20 having a substantially flat display surface 22 and a housing 40 coupled to the display 20 for enclosing various internal components (not shown). A stand 60 is movably connected to the housing 40 for pivoting with respect to the housing 40 about a pivot axis P between an extended position E, as shown in FIG. 1, and a retracted position R, as shown in FIG. 2. When the stand 60 is in an extended position E, the television 10 may be conveniently set on a horizontal or inclined support surface such that the stand 60 provides suitable support for the display 20, the housing 40, and the internal components of the television 10. Alternatively, when the stand 60 is in the retracted position R, the television 10 may be conveniently coupled to a wall or other vertical support structure with the stand 60 substantially or completely hidden from view behind the display 20. The housing 40 may include various means for attaching to a wall (or other similar structure), such as, for example, spaced mounting apertures 48 located on a back surface 42 of the housing 40 that are configured to receive corresponding fasteners or protrusions rigidly attached to the wall. In this manner, the television 10 can be transported between various locations and mounted in a variety of positions and/or arrangements with ease.

Figure 3A:
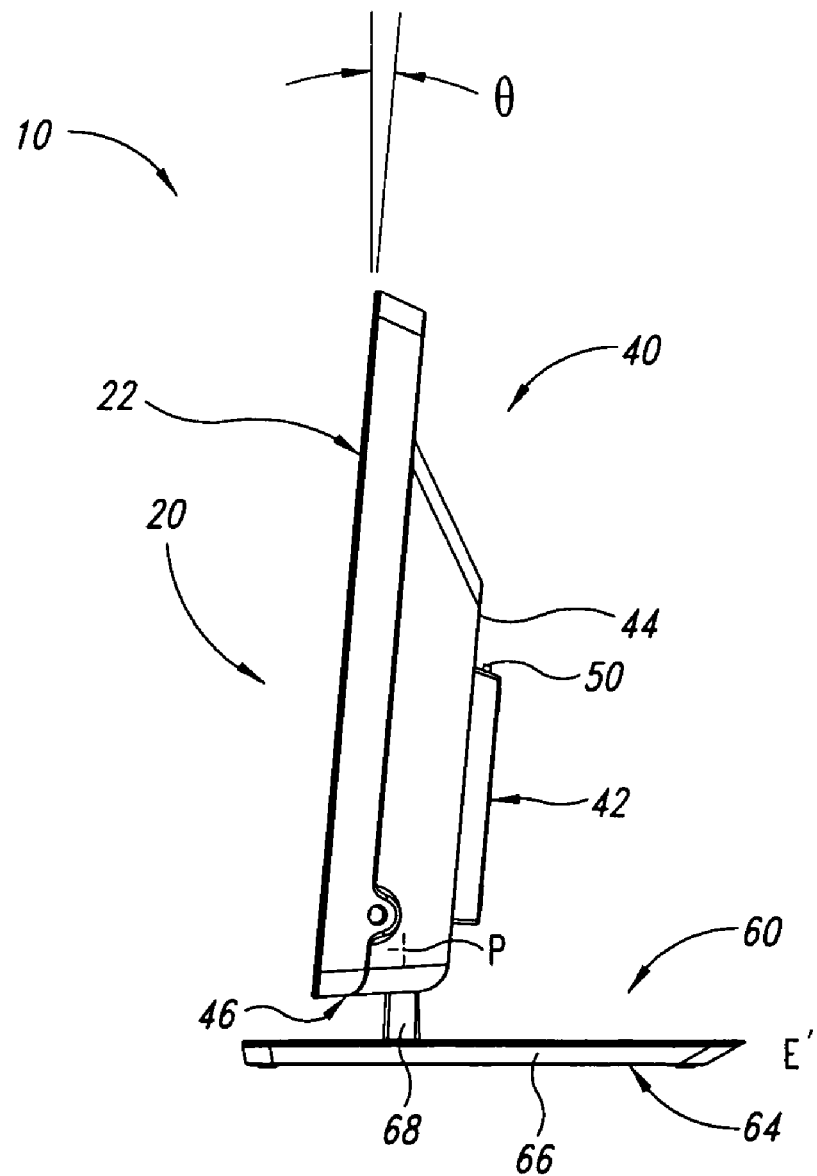
FIGS. 3A-3B are side elevational views of the television of FIG. 1 with the stand in various extended positions.
Figure 3B:
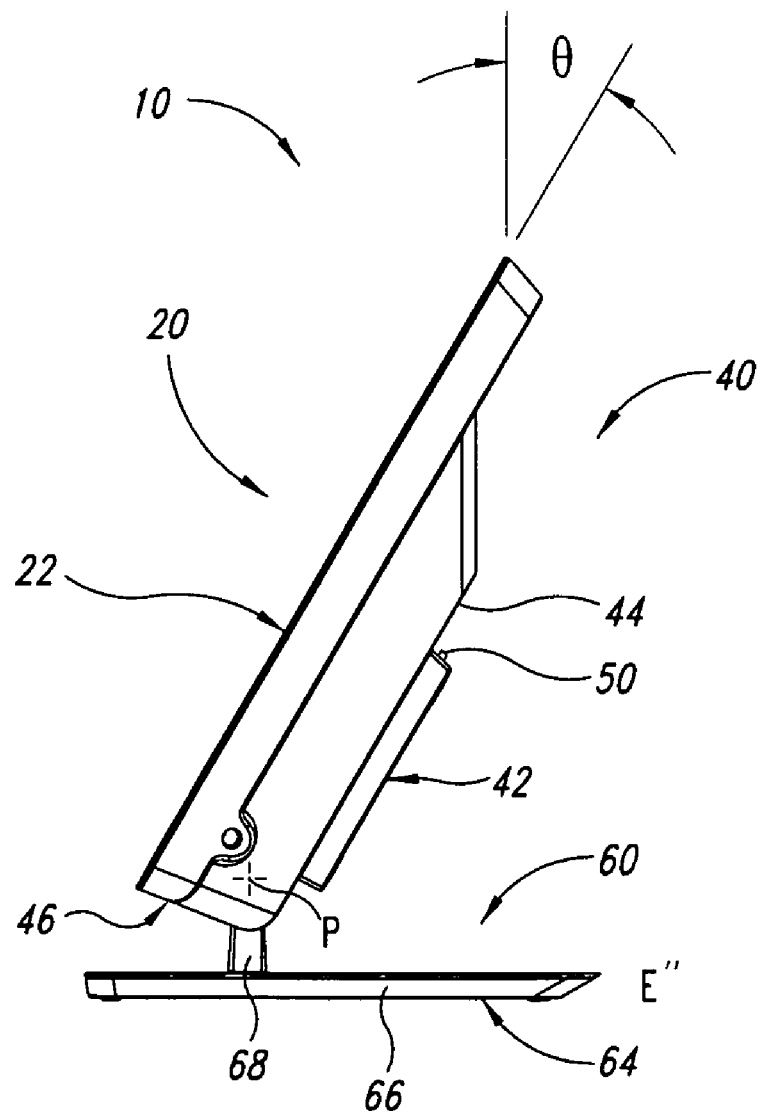

With reference to FIGS. 3A-3B, the stand 60 is configured to pivot with respect to the housing 40 about pivot axis P to an extended position E', E" in such a manner that the housing 40 may be maintained in one or more selectable viewing orientations. For example, the stand 60 can rotate to a first extended position E' (as shown in FIG. 3A) corresponding to a first viewing orientation or a second extended position E" (as shown in FIG. 3B) corresponding to a second viewing orientation. The viewing orientations may each be defined by a respective tilt angle θ measured with respect to a vertical reference line. For example, the viewing orientation illustrated in FIG. 3A has a tilt angle θ of about 5 degrees, whereas the viewing orientation illustrated in FIG. 3B has a tilt angle θ of about 30 degrees. Although the range of selectable viewing orientations may vary, in some embodiments the tilt angle θ corresponding to selectable viewing orientations may range, when the television is placed on a horizontal support surface, from at least between −5 degrees to 20 degrees, and in other embodiments, may range between −10 degrees and 90 degrees.

Each viewing orientation may be maintained against the force of gravity by, for example, frictional resistance designed in to the pivot interface between the stand 60 and the housing 40. For example, an adjustable tension hinge (not shown) may be coupled between the stand 60 and the housing 40. Other means for selectively holding the housing 40 in one or more of the selectable viewing orientations may include a ratcheting mechanism or detent mechanism coupled between the stand 60 and the housing 40. For example, a spring-biased detent ball or resilient protrusion on the stand 60 may engage detents in the housing 40 (or vice versa) to selectively adjust the display 20 to different viewing orientations, such as, for example, in 5 degree increments of tilt angle θ (e.g., 5°, 10°, 15°, etc.) The ability to select from various viewing orientations enables a user to easily transport the television 10 from one location to another, place the television 10 on a variety of support surfaces (such as a horizontal or inclined support surface), and adjust the display 20 to a comfortable viewing orientation.

Figure 4:
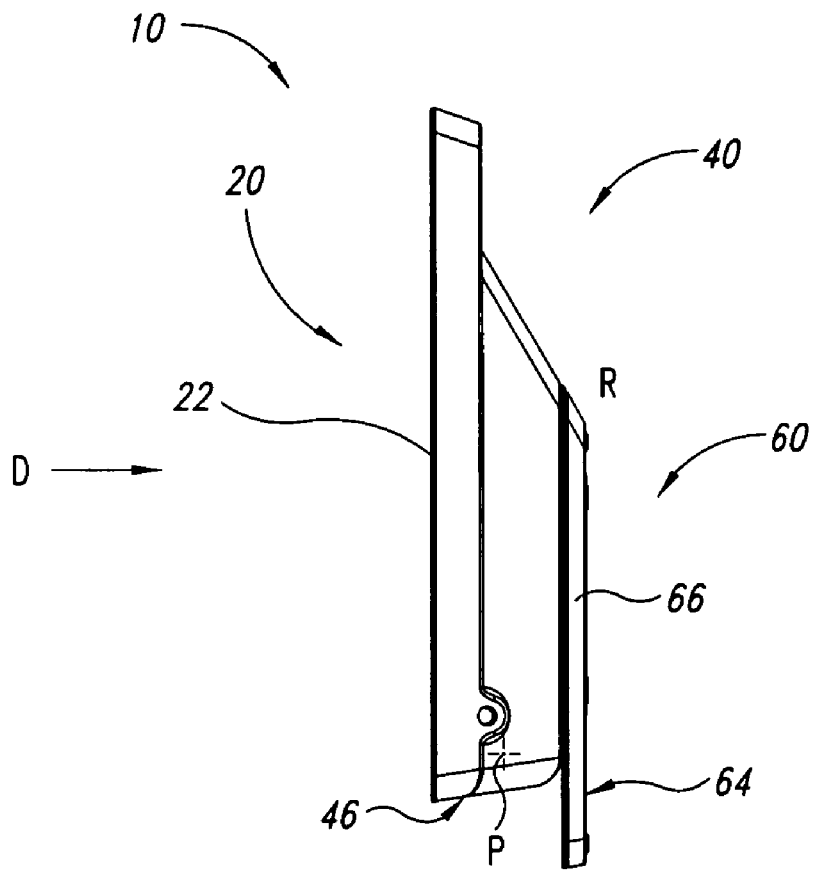
FIG. 4 is a side elevational view of the television of FIG. 1 with the stand in a retracted position.

With reference to FIG. 4, the stand 60 is configured to pivot with respect to the housing 40 about pivot axis P to a retracted position R in such a manner that the television 10 may be coupled to a wall or other vertical (or somewhat vertical) support structure with the stand 60 substantially or completely hidden from view behind the display 20. More particularly, the stand 60 is adapted to pivot to a retracted position R such that a majority of the stand 60 is located within a perimeter of the display surface 22 projected towards the back surface 42 of the housing 40. In other words, when viewing the display 20 in a first direction D substantially perpendicular to the display surface 22, more than half of an outer projected profile of the stand 60 is located within the projected perimeter of the display surface 22. In some embodiments, a substantial portion (e.g., more than 70%) of the stand 60 is located within the projected perimeter of the display surface 22, and in other embodiments, the entire stand 60 is located within the projected perimeter of the display surface 22. Consequently, when viewing the display 20 along a first direction D substantially perpendicular to the display surface 22, the stand 60 is likewise substantially hidden from view behind the housing 40. In some embodiments, when viewing the display 20 along the first direction D, the stand 60 may be located within a projected outer perimeter of housing 40 such that the stand 60 is completely hidden from view. Accordingly, the television 10 can be quickly and efficiently transitioned from a free-standing television to a wall-mounted television in an aesthetically pleasing form-factor or package (i.e., with the stand substantially or completely hidden from view behind the display 20).

As shown in the illustrated embodiment of FIGS. 1-4, the stand 60 includes a support member 66, illustrated as a rectangular frame structure, and elongated support legs 68. The support legs 68 extend outwardly from the support member 66 and include an aperture or other means for receiving a hinge or other pivot mechanism for rotatably coupling the stand 60 to the housing 40. The support legs 68 space the stand 60 away from the housing 40 and enable the stand 60 to pivot about the pivot axis P from the extended position E to the retracted position R. In the extended position E, the support legs 68 space the display 20 away from a support surface (e.g., table, desk, etc.) and in the retracted position R, positions the support member 66 such that the stand 60 is at least substantially hidden from view, as discussed above. Although the illustrated embodiment includes two support legs 68, more or fewer support legs 68 may be provided.

The pivot axis P is located behind a plane that includes the display surface 22 and above a lower surface 46 of the housing 40 such that, when the stand 60 is in the retracted position R, the support legs 68 pivot to a position wherein at least a majority of the stand 60 (including the support legs 68) is located behind the housing 40 and the display 20. In some embodiments, no portion of the support legs 68 is visible when viewing the display 20 in the first direction D substantially perpendicular to the display surface 22.

The support member 66 is generally sized to provide a stable base for the display 20, the housing 40 and internal components of the television 10, when the stand 60 is in an extended position. In some embodiments, the support member may include a handle portion that enables a user to grasp the television 10 and carry it securely from one location to another. For example, in the illustrated embodiment, the support member 66 includes a rectangular frame wherein a transverse member of the frame is adapted to provide a suitable handle when in the retracted position R (as best shown in FIGS. 2 and 4). Although the support member 66 is illustrated as a rectangular frame structure, the support member 66 may vary in size and shape.

In some embodiments, the stand 60 may include a substantially flat bottom surface 64, such that, when the stand 60 is in the retracted position R, the bottom surface 64 is substantially parallel to the display surface 22. Likewise, the bottom surface 64 may be substantially parallel to the back surface 42 of the housing 40 when the stand 60 is in the retracted position R, and in some embodiments may be substantially coplanar therewith. In other embodiments, the bottom surface 64 of the stand 60 may be offset from the back surface 42 when in the retracted position R such that the stand 60 is located between a plane including the back surface 42 and the display 20. In still other embodiments, the stand 60 may be located, when in the retracted position R, within a volume defined by projecting the outer perimeter of the housing 40 from the display surface 22 to the back surface 42. Consequently, the back surface 42 of the housing 40 may come in contact with a wall or a separate mounting bracket located on a wall without interference from the stand 60. In this manner, the television 10 is particularly suited for effortless transition from a freestanding television to a wall-mounted television.

In various embodiments, the housing 40 may include a recessed portion or cavity sized to at least partially receive a portion of the stand 60. For example, the housing 40 may include a cavity sized to receive a portion of the illustrated rectangular frame of stand 60. In other embodiments, a back surface 42 of the housing 40 may be offset from another portion 44 of the housing 40 such that a void or space is created around the perimeter of the back surface 42 for receiving at least a portion of the stand 60 in the retracted position R. As such, the back surface 42 of the housing 40 is able to come in contact with a wall or a separate mounting bracket located on a wall without interference from the stand 60.

In some embodiments, the housing 40 of the television 10 includes a latch or lock 50 coupled to housing 40 for retaining the stand 60 in the retracted position R. Locking the stand 60 in this manner facilitates mounting the television 10 on a wall or similar structure by preventing unintended movement of the stand 60 towards an extended position E. The latch or lock 50 also prevents unintended movement of the stand 60, when the stand 60 is used as a handle to carry the television 10. The latch or lock 50 may be a depressible latching mechanism, as illustrated, or may include other locking means, such as, for example, a spring-biased detent ball configured to engage a portion of the stand 60.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A television, comprising:
a display having a substantially flat display surface;
a housing coupled to the display; and
a stand having an elongated support leg and a support member, the support leg of the stand pivotably coupled to the housing about a pivot axis extending parallel to the display surface such that the stand is movable between a first position in which a majority of the support member of the stand is located within a perimeter of the display surface projected towards a back surface of the housing and a second position in which the stand is adapted, when placed on a support surface, to support the display in a viewing orientation, and the housing having a space to receive at least a portion of the support member of the stand when the stand is in the first position so the back surface of the housing is exposed to mount the television to a support structure without interference from the stand.

2. The television of claim 1, wherein, when the stand is in the first position, a bottom surface of the support member of the stand is substantially parallel to the display surface.

3. The television of claim 1, wherein, when the stand is in the first position, a bottom surface of the support member of the stand is substantially coplanar with the back surface of the housing.

4. The television of claim 1, wherein, when the stand is in the first position, the support member of the stand is at least partially received within an outer profile of the housing when viewed from a side of the television.

5. The television of claim 1, wherein the viewing orientation is one of a plurality of selectable viewing orientations.

6. The television of claim 1, wherein the viewing orientation is defined by a tilt angle that ranges from at least between −5 degrees to 20 degrees.

7. The television of claim 1, further comprising:
a latch for retaining the stand in the first position.

8. A television, comprising:
a display having a substantially flat display surface;
a housing coupled to the display; and
a stand including a support member and at least one elongated support leg that projects from the support member, the stand movably coupled to the housing such that the stand can be moved between a first position in which the support member is substantially parallel to the display surface and the support leg is located within an outer perimeter of the housing projected towards a back surface of the housing and a second position in which the stand is adapted to, when placed on a support surface, support the display in a viewing orientation, and the housing having a space to receive at least a portion of the support member of the stand when the stand is in the first position so the back surface of the housing is exposed to mount the television to a support structure without interference from the stand.

9. The television of claim 8, wherein, when the stand is in the first position, a bottom surface of the support member is substantially coplanar with the back surface of the housing.

10. The television of claim 8, wherein, when the stand is in the first position, the stand is at least partially received within an outer profile of the housing when viewed from a side of the television.

11. The television of claim 8, wherein the viewing orientation is one of a plurality of selectable viewing orientations.

12. The television of claim 8, wherein the viewing orientation is defined by a tilt angle that ranges from at least between −5 degrees to 20 degrees.

13. The television of claim 8, further comprising:
a latch for retaining the stand in the first position.

14. A television, comprising:
a display;
a display housing; and
a stand pivotably connected to the display housing about a pivot axis for movement between a retracted position and a selectable viewing position, the pivot axis located above a lower surface of the display housing such that at least a substantial portion of the stand is located, when the stand is in the retracted position, within a perimeter of the display projected towards a back surface of the display housing, and the display housing having a space to receive at least a portion of the stand when the stand is in the retracted position so the back surface of the display housing is exposed to optionally mount the television to a support structure without interference from the stand.

15. The television of claim 14, wherein, when the stand is in the retracted position, the stand is within a projected outer perimeter of the display housing.

16. The television of claim 14, wherein the display includes a substantially flat display surface, and wherein, when the stand is in the retracted position, a bottom surface of the stand is substantially parallel to the display surface.

17. The television of claim 14, wherein, when the stand is in the retracted position, a bottom surface of the stand is substantially coplanar with the back surface of the display housing.

18. The television of claim 14, wherein, when the stand is in the retracted position, the stand is at least partially received within an outer profile of the display housing when viewed from a side of the television.

19. The television of claim 14, wherein the selectable viewing position is defined by a tilt angle that ranges from at least between −5 degrees to 20 degrees.

20. The television of claim 14, further comprising:

a latch for retaining the stand in the retracted position.

* * * * *